United States Patent [19]
Wallén

[11] 3,943,034
[45] Mar. 9, 1976

[54] DEWATERING AND HOMOGENIZING APPARATUS

[75] Inventor: Lennart E. O. Wallén, Stockholm, Sweden

[73] Assignee: Lennart Wallen & Co AB, Stockholm, Sweden

[22] Filed: Apr. 5, 1974

[21] Appl. No.: 458,354

[30] Foreign Application Priority Data
Apr. 5, 1973 Sweden .............................. 7304809

[52] U.S. Cl. ................ 162/232; 100/117; 100/147; 162/18; 162/261; 210/414
[51] Int. Cl.² ......................................... D21C 9/18
[58] Field of Search ......... 162/18, 56, 261, 28, 293, 162/232; 100/73, 93 S, 117, 147; 34/70; 210/414; 425/84, 376 R, 376 A

[56] References Cited
UNITED STATES PATENTS

| | | | |
|---|---|---|---|
| 2,534,324 | 12/1950 | Hildebrandt | 162/56 X |
| 2,771,361 | 11/1956 | Birdseye et al. | 162/56 X |
| 2,964,179 | 12/1960 | Loevenstein et al. | 210/83 X |
| 3,016,324 | 1/1962 | Textor | 162/28 X |
| 3,092,338 | 6/1963 | Reinhall | 100/117 X |
| 3,154,007 | 10/1964 | Schaub et al. | 100/147 |
| 3,181,454 | 5/1965 | Ginaven et al. | 100/117 X |
| 3,230,865 | 1/1966 | Hibbel et al. | 100/147 X |

FOREIGN PATENTS OR APPLICATIONS

| 167,916 | 3/1954 | Australia | 162/261 |
|---|---|---|---|

Primary Examiner—S. Leon Bashore
Assistant Examiner—Marc L. Caroff
Attorney, Agent, or Firm—Kenyon & Kenyon Reilly Carr & Chapin

[57] ABSTRACT

Dewatering and homogenizing apparatus comprising a screw thickener at the discharge end provided with a plug forming means actuated by pulling means. At the thickener's discharge end there is also mounted a hood for receiving dewatered pulp and with supply means for homogenizing agent.

5 Claims, 2 Drawing Figures

DEWATERING AND HOMOGENIZING APPARATUS

The present invention relates to a dewatering and homogenizing apparatus comprising a thickener with a shaft rotatable in a screen drum and provided with at least one flight in helicoid form, the screen drum and the envelopes of said at least one flight preferably tapering towards the discharge end of the thickener and the shaft preferably being displaceable, and with feeding means mounted at one end of the screen drum and plug forming means (stuffing means) and discharge means at its other end.

It is known to dewater fibrous pulps having e.g. a concentration (consistency) of about 1 % and then to beat them at a higher concentration. Dewatering should take place before beating in order that too great an amount of energy should not be consumed in beating. However, when using dissolved return paper (return paper treated in a pulper) great difficulties have been experienced, as small pieces of plastic, of bitumen and of wet strength paper have not been completely dissolved.

Efforts have been made to solve these problems by heating the pulp in the thickener. Some improvement has then been obtained, but there have been great difficulties with this heating suggested and there has only been obtained a poor heating of the pulp.

Now it has been found that when using return paper said difficulties can be substantially eliminated by treating the pulp obtained after dewatering with vaporized solvent. According to the invention this is carried out in a device, which is characterized in that the plug forming means is provided with pulling means and that a hood provided with discharge means and supply means for homogenizing agents is mounted liquid-tight and vapor-tight close to the discharge end of the thickener for receiving the dewatered pulp and for simplifying its homogenization. The homogenization agent is preferably water vapor or a vaporized solvent. The discharge means from the hood can e.g. consist of a partially throttled valve or of double valves arranged as a sluice. The discharge from the hood can alternatively or in addition also take place through a cyclone or a mill. It is suitable that the screen drum closest to its discharge end is mounted for supply of homogenizing agent, preferably steam. In a preferred embodiment at least the flight closest to the discharge end of the screen drum are hollow and provided with holes on the side turned from the transport direction for extracting liquid or supply of homogenizing agent, especially steam.

The screen drum as well as the envelope of said at least one flight can by cylindrical. The shaft is preferably cylindrical, but can be enlarged conically towards the discharge end. The screen holes can be of the same size or their diameters can increase towards the discharge end. It is also possible to use a thickener with an axially fixed shaft; it shall still be rotatable, of course.

Steam is preferably supplied to the thickener at its portion closest to its discharge end and steam can also be supplied through the holes in said at least one flight. As indicated above, liquid can also be extracted through these holes. If steam is to be supplied or liquid be extracted, depends on the pulp supplied. When there are present large amounts of plastic and bitumen steam is preferably supplied.

The present plug forming means with pulling means provide an even discharge of pulp and, moreover, it has the advantage, that the whole thickener will be shorter and that the motor for operation of the thickener can be easily mounted at the discharge end, which results in easier bearing problems. In this way the shaft can also be made easily displaceable by changing the position of the bearing assembly or displacing the whole motor. This is especially advantageous at the preferred embodiment, in which the screen drum and the envelopes of the flights taper towards the discharge end of the thickener and the diameter of the shaft moreover can increase towards the discharge end. In this way the play between the flight and the screen drum can be easily adjusted to the pulp being dewatered. At the present dewatering and homogenizing apparatus the plug forming means moveover acts as a security valve. At elevated pressure, vapor pressure or liquid pressure in the screw thickener the plug forming means is opened and the pressure in the screw thickener is reduced. The sum of the axial force on the plug forming means, which is generated by the vapor pressure, and the pulp pressure caused by the screw are thus balanced by the pulling action on the plug forming means. By the plug forming means it is also achieved that the pulp being under liquid pressure in the screw thickener is discharged into the hood after the thickener without first being in contact with air.

A homogenizing agent is supplied in the hood located after the thickener. This makes the pulp quite homogeneous. For economical reasons water vapor is the most suitable homogenizing agent, but other solvents and vapors of solvent can also be used, e.g. alcohols, hydrocarbons or halogenated hydrocarbons. In the homogenizing agent emulsifiers and/or dispersing agents can also be included. They can be of a known type.

The invention is described more in detail with reference to the accompanying drawing, on which an embodiment of the present dewatering and homogenizing apparatus is schematically shown.

In this drawing.

Figures 1, 2:
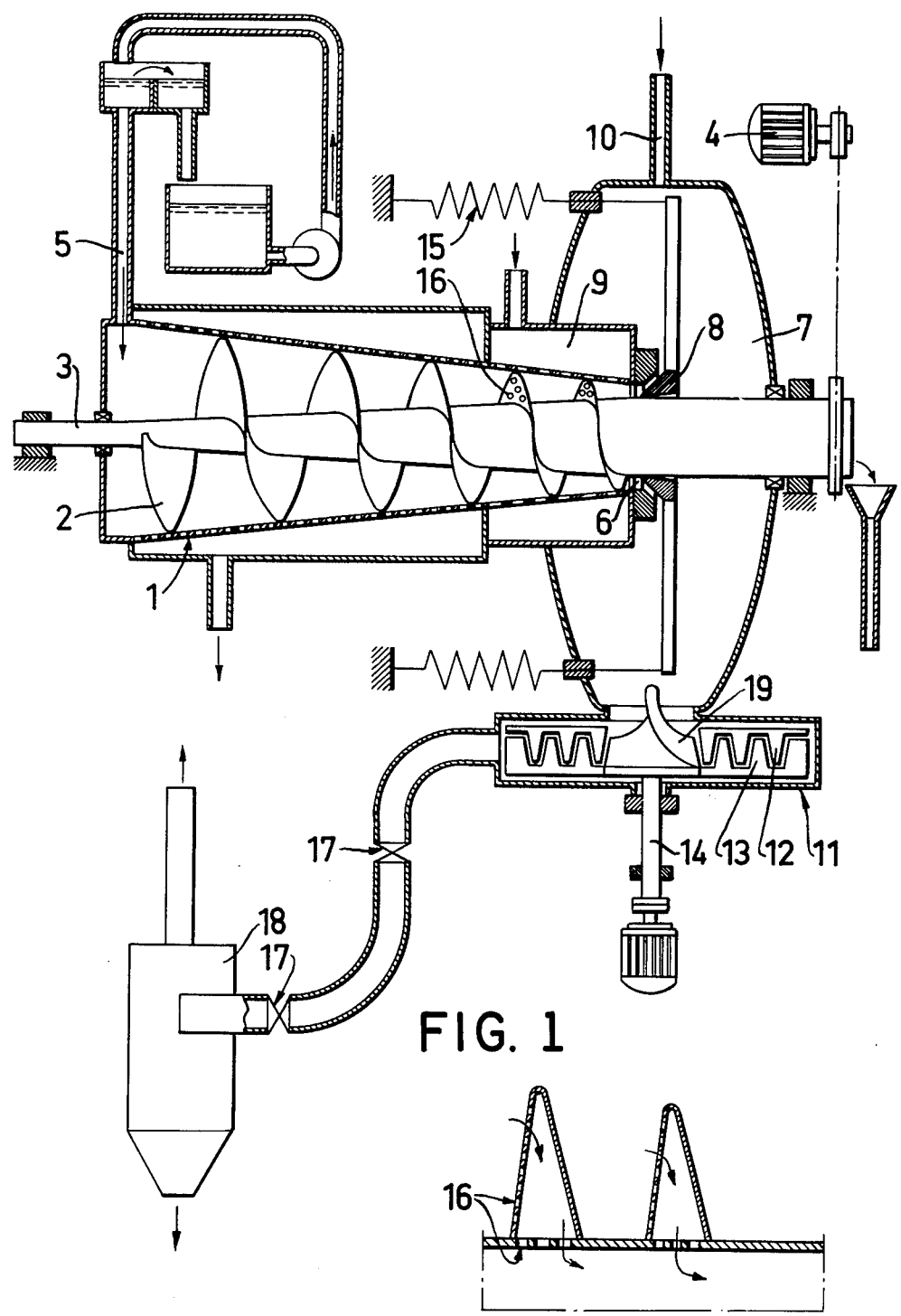
FIG. 1 shows the apparatus in vertical section.
FIG. 2 is a detail on an enlarged scale.

The dewatering and homogenizing apparatus shown on the drawing comprises a screen drum 1, in which a flight 2 in the form of a screw is disposed. This screw 2 is mounted on a shaft 3, which is driven by a motor 4. A pulp suspension is supplied at 5 and discharged at 6 to a hood 7. A plug forming means 8 is placed at this discharge end 6, which lies close to the edges of the discharge end 6 and against the shaft 3. The plug forming means 8 is present by means of pulling, adjustable screws and springs 15, the number of which is at least two, preferably at least three, evenly distributed around the periphery. The pulling can also take place in another way, e.g. hydraulically, but the action must always be a pulling action. Steam is supplied in the third portion 9 of the screen drum 1, which is located closest to the discharge end 6. In the corresponding part of the screw 2 holes 16 are made in the flight on the side turned from the discharge end 6. Here the shaft 3 is hollow and is connected with these holes. The shaft 3 is hollow as far as outside the discharge end 6, where it is mounted and where water from the pulp suspension is extracted through the holes 16 in the flight. Steam is supplied to the hood 7 through a conduit 10. The pulp supplied through the discharge end 6 in the hood 7 is discharged through a mill 11 with a stationary grinding disc 12 and a rotating grinding disc 13 with a feed-down impeller 19, whose shaft 14 is vertically arranged. The mill 11 is a pin mill operating under vaporous overpressure and is provided with two valves 17 with a sluice and a cyclone 18.

In operation a pulp of dissolved return paper is supplied to the thickener through the inlet portion 5. The pulp concentration (consistency) is preferably 3 – 6 %, but can e.g. be within the range of 1 – 10 %. In the dewatering portion the water is first discharged through the screen drum 1 and steam is supplied at the end of the screen drum in the portion 9, which promotes dewatering and starts the homogenization of the pulp. Water is extracted through the holes in the flight and through the hollow shaft 3. The pulp concentration at the discharge end 6 is here 32 %, but it can e.g. be between 20 and 50 %. Steam is then supplied to the pulp of 32 % through the conduit 10. The pulp is then discharged from the hood 7 through the mill 11 and a homogeneous pulp is the result of the treatment carried out. The amount of steam through the conduit 10 is adapted according to the need. The pulp in this case with a high content of bitumen and plastic, which was obtained from the return paper used, required rather large amounts of steam, approx. 500 kgms based on each 1000 kgms of dry pulp.

What is claimed is:

1. An apparatus for dewatering and homogenizing a pulp suspension and comprising a screen drum having inlet and outlet ends and tapering from the inlet end to the outlet end, a rotative shaft extending through the drum and beyond both ends of the drum, means for enclosing the drum radially throughout its length while leaving its outlet end axially open around the shaft, plug-forming means surrounding the shaft at the drum's outlet end and movable towards and from the outlet end, the shaft having screw-flights of helicoid shape inside of the drum and radially tapering from the drum's inlet to its outlet end, for forcing pulp when fed to its inlet end against the plug-forming means, means for forming a chamber having a fluid inlet and an outlet, the chamber fluid-tightly enclosing the drum's outlet and plug-forming means, the adjacent end of the shaft extending through the chamber and having a journaled end on the outside of the chamber and free from the chamber's inside, and means inside of the chamber and extending radially from the plug-forming means and forming backward extending tension members extending backwardly through the chamber to its outside and externally of said screen drum for receiving backward-pulling force applied on the chamber's outside for biasing the plug-forming means towards the drum's outlet end.

2. The apparatus of claim 1 in which the shaft is hollow at least from adjacent to the drum's outlet end to the shaft's journaled end on the outside of the fluid-tight enclosing chamber for the drum's outlet end, and at least one of the screw-flights adjacent to the drum's outlet end is hollow and has holes facing backwardly, the hollow screw-flight communicating with the shaft's hollow portion and this portion having an outlet.

3. The apparatus of claim 1 in which the chamber's outlet has means for passing pulp while substantially holding fluid-pressure in the chamber.

4. The apparatus of claim 1 in which the shaft is axially movable.

5. The apparatus of claim 1 in which the said journaled end of the shaft has means for rotatively driving the shaft.

* * * * *